United States Patent Office 2,818,415
Patented Dec. 31, 1957

2,818,415

ADDUCTS OF LONG CHAIN OLEFINIC ACID AMIDES AND FUMARIC ACID ESTERS

Joachim Dazzi, Dayton, Ohio, assignor to Monsanto Chemical Company, St. Louis, Mo., a corporation of Delaware No Drawing. Application January 26, 1954
Serial No. 406,337

9 Claims. (Cl. 260—404)

This invention relates to high molecular weight adducts and more particularly provides high molecular weight compounds having a plurality of carboxylate radicals and a process for producing the same.

An object of the invention is the provision of new and useful polycarboxylates. Another object of the invention is the preparation of high molecular weight polycarboxylates from higher olefinic amides. A further object of the invention is to provide for the synthetic resins and plastics, rubber, paint coatings and textile industries a new class of high molecular weight, nitrogenous polycarboxylates.

These and other objects hereinafter disclosed are provided by the following invention wherein there are provided adducts of higher olefinic amides and fumarates having the formula

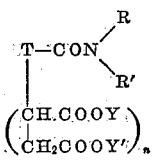

in which T is an aliphatic olefinic hydrocarbon residue free of conjugated unsaturation and having from 9 to 23 carbon atoms, R and R' are selected from the class consisting of hydrogen and alkyl radicals of from 1 to 8 carbon atoms, n is an integer of from 1 to 4 and Y and Y' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals.

The useful fumarates have the formula

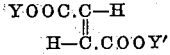

in which Y and Y' are as defined above. Fumarates having this formula and useful for the present purpose include, e. g., the simple alkyl fumarates such as methyl, ethyl, isopropyl, n-propyl, n-butyl, tert-butyl, isoamyl, n-hexyl, n-heptyl or isooctyl fumarate; the mixed alkyl fumarates such as ethyl methyl fumarate, methyl n-octyl fumarate and butyl 2-ethylhexyl fumarate; the simple alkoxyalkyl fumarates such as bis-(2-methoxyethyl), bis(3-ethoxy-n-propyl), or bis(4-butoxybutyl) fumarate; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol monoether such as ethyl 2-ethoxyethyl fumarate or n-amyl 3-propoxy-2-propyl fumarate, the hydroxyalkyl fumarates such as bis(2-hydroxyethyl)-fumarate or n-propyl 3-hydroxypropyl fumarate; the alicyclic fumarates such as cyclopropyl fumarate, cyclopentyl fumarate and cyclohexyl fumarate or octyl cyclopentyl fumarate; the alkylmercaptoalkyl fumarates such as bis(4-ethylmercaptobutyl)fumarate; the aryl fumarates such as phenyl fumarate, β-naphthyl fumarate, 2-xenyl fumarate, or ethylphenyl fumarate or 2-ethoxyethyl β-naphthyl fumarate; the aralkyl fumarates such as benzyl fumarate or amyl benzyl fumarate, furfuryl fumarate, tetrahydrofurfuryl fumarate, phenyl furfuryl fumarate, etc.

Higher olefinic amides useful for preparation of adducts having the above general formula are the amides, N-alkylamides or N,N-dialkylamides of non-conjugated, non-hydroxylated olefinic acids having from 10 to 24 carbon atoms in the acid portion of the molecule. As examples of the presently useful amides may be mentioned decenamide, undecenamide, dodeceneamide, palmitoleamide, oleamide, elaidamide, erucamide, cetoleamide, linoleamide, and linolenamide and the N-alkyl or N,N-dialkyl derivatives thereof such as N-methylundecenamide, N-ethyloleamide, N-isopropyllinoleamide, N-n-butyldodecenamide, N-n-amyloleamide, N-n-hexyllinoleamide, N-n-heptylerucamide, N-(2-ethylhexyl)oleamide, N,N-diethyloleamide, N,N-diisobutyllinoleamide, N,N - n - dioctylelaidamide, N,N-bis(2-ethylhexyl)undecenamide, N-ethyl-N-methyloleamide, N-butyl-N-octyllinoleamide, etc. Particularly useful are the N,N-dialkylamides of technical mixtures of fatty acids comprising higher unsaturated fatty acids predominantly, for example, tall oil unsaturated fatty acid fractions or the unsaturated fatty acid fractions obtainable from tallow; such fractions usually consist at least 90% by weight of olefinic acids.

Formation of the present adducts proceeds by addition of the amide with from 1 to 4 moles of the fumarate, substantially according to the scheme

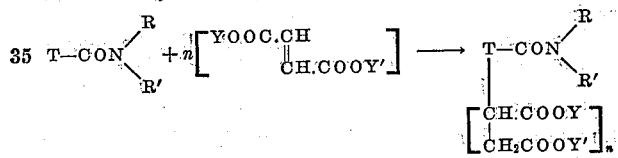

wherein T, R, R', Y, Y' and n are as defined above.

Reaction of one mole of the amide with one mole of the fumarates gives the 1,2-dicarboxyethylated amides of the formula

It is to be noted that the product still contains olefinic group or groups of the oleamide or the linoleamide, the structure of a 1:1 N,N-dialkyloleamide-dimethyl fumarate adduct probably being

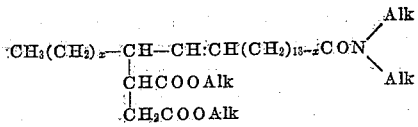

in which Alk denotes an alkyl radical of from 1 to 8 carbon atoms.

The 1:1 amide—fumarate adduct adds to another mole of fumarate to give a compound in which two 1,2-dicarboalkoxy radicals are attached to the fatty acid portion of the amide. Depending upon the quantity of fumarate present in the reaction mixture, the heating temperature and duration of heating, as many as four moles of the fumarate may be combined at respective intermediate portions of the long olefinic chain of the amide, the olefinic double bond in each case remaining unsaturated. Generally, reaction of the N,N-dialkyl amide with the fumarate results in a mixture of adducts of such varying amide—fumarate ratios.

Reaction of the amide with the fumarate to form the present adducts takes place readily by heating the amide with the ester in the presence or absence of an inert diluent or solvent at ordinary or superatmospheric pressures. When operating at atmospheric pressure, temperatures of from, say, 125° C. to 300° C. and preferably of from 180° C. to 250° C. are used. When working with readily polymerizable fumarates, an inhibitor of polymerization may be incorporated into the reaction mixture. Catalysts may or may not be used. The number of carboalkoxy groups introduced into the amide depends upon the nature of the individual ester used, and upon the reaction conditions employed. Generally, operation within the higher temperature ranges, i. e., at temperatures of above, say, 180° C. and below the decomposition point of any of the reactants leads to introduction of more carboalkoxy groups than does operation at the lower temperatures. Usually, the lower alkyl fumarates are more reactive than either the higher alkyl fumarates or the higher alkoxyalkyl fumarates. In view of the effect of the reaction conditions and nature of the fumarates upon the extent of carboalkoxylation, it is recommended that for each initial run there be experimentally determined the operating conditions which should be observed for obtaining the desired degree of carboalkoxylation.

Since the presently useful esters are generally solvents for most of the long chain amides, under the reaction conditions used, no extraneous solvent or diluent usually need be employed. However, in order to facilitate handling of some of the amides, it may be advantageous to work in an inert, extraneous diluent or solvent, e. g., a liquid hydrocarbon or a liquid derivative thereof such as benzene, xylene, or a high-boiling aliphatic hydrocarbon such as kerosene, halogenated aliphatic hydrocarbons, etc. When operating at atmospheric pressure such diluent is generally removed before reaction of the amide with the fumarate occurs, due to the high temperature used. For successful reaction, the diluent may or may not be present.

The present adducts are stable, high-boiling materials which range from heavy to viscous liquids. They may be advantageously employed for a variety of technical uses, i. e., as moisture-proofing agents, lubricant adjuvants, rubber softeners, etc.

The present amide-fumarate adducts are valuable plasticizers for polyvinyl chloride and copolymers of at least 70 percent by weight of vinyl chloride and up to 30 percent by weight of an unsaturated monomer copolymerized therewith, for example, vinyl acetate, vinylidene chloride, etc. The present adducts impart great flexibility to vinyl chloride polymers at very low temperatures; they are compatible with such polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of the present adducts will, in most cases, be satisfactory for general utility. The good flexibility of the plasticizer composition increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a compositon is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is a modified carbon absorption test procedure of the Society of Plastics Industry.

*Water resistance.*—The amount of water absorption and the amount of leaching that takes place when the plasticized composition is immersed in distilled water for 24 hours is determined.

*Kerosene extraction.*—Resistance to kerosene is measured as follows: A 2″ diameter 40 mil. disc is suspended in a 50° C. oven for a 3-hour conditioning period to eliminate water, then cooled and weighed. The conditioned sample is then immersed in 400 ml. of kerosene for a period of 24 hours, at 27° C. The sample is then removed from kerosene, blotted dry and suspended in a force-draft 80° C. oven for 4 hours. The sample is then cooled and weighed. The percent loss in weight is reported as the kerosene extraction value.

The invention is further illustrated, but not limited, by the following examples:

*Example 1*

This example describes the addition reaction of butyl fumarate and a mixture of the N,N-dimethylamides of a commercially available tall oil fatty acid fraction known to the trade as Acintol FA No. 2. This acid product is reputed to consist 50 percent by weight of oleic acid, 48 percent by weight of linoleic acid and 2 percent by weight of saturated acids. The mixture of N,N-dimethylamides was prepared in known manner by condensation of the Acintol with dimethylamine. Hence, the presently employed mixture of amides may be characterized as consisting predominantly of N,N-dimethyloleamide and N,N-dimethyllinoleamide.

To a reaction vessel equipped with mechanical stirrer, thermometer, and a Dean-Stark trap carrying a reflux condenser, there was charged 123.6 g. (0.4 mole) of said mixture of N,N-dimethylamides, 273 g. (1.2 moles) of n-butyl fumarate and 0.6 g. of di-tert-butylcatechol. The reaction mixture was refluxed (240–251° C.) for 6 hours. During this time the refractive index of the reaction mixture rose from an initial value of $n_D^{25}$ 1.4532 to a final value of $n_D^{25}$ 1.4642. Vacuum distillation of the resulting reaction mixture in a nitrogen atmosphere gave 83.9 g. of a fraction (I) B. P. up to 160° C./1 mm., $n_D^{25}$ 1.4440, unreacted fumarate; 80.5 g. of a fraction (II) B. P. 160–208° C./1 mm., $n_D^{25}$ 1.4632, analyzing 2.43% nitrogen and having an iodine number of 47.43, and as residue, liquid boiling above 208° C./1 mm., $n_D^{25}$ 1.4717, analyzing 1.48% N, and having an iodine number of 30.26. The calculated nitrogen content and iodine values of the residue indicates it to be a mixture of 1:1, 1:2, and 1:3 amide—fumarate addition products.

*Example 2*

Sixty parts of polyvinyl chloride and 40 parts by weight of the viscous residue of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 13° C. Tests on the volatility characteristics of the plasticized composition gave a value of 1.4 percent, which showed very good retention of plasticizer and indicated good temperature characteristics of the composition. When subjected to heat at a temperature of 325° F. for a period of 30 minutes the clarity and color of the molded product was substantially unchanged. Tests of the water resistance properties of the plasticized material employing the testing procedure described above showed a solids-loss of only 0.02 percent and an 0.71 percent water absorption value. The kerosene extraction value of the plasticized material was 0.00. The excellent kerosene resistance of the present adduct is remarkable, for the kerosene extraction value of the N,N-dimethylamide of the same tall oil acid fraction is 35.8; that of N,N-dimethyloleamide is 43, as determined by the same procedure.

Instead of the adducts of dibutyl fumarate and the mixture of dimethyl amides of oleic and linoleic acid, adducts prepared from other fumarates and either an N,N-dialkyloleamide, alone, or an N,N-dialkyllinoleamide, alone, give similarly good results as polyvinyl chloride plasticizers. Thus by employing 40 parts by weight of the adduct of methyl or ethyl fumarate and N,N-diamyloleamide or the adduct of 2-ethylhexyl or amyl fumarate and N,N-dibutyllinoleamide with 60 parts by weight of a vinyl chloride-vinyl acetate copolymer known to the trade as "Vinylite" there are obtained clear, colorless compositions of very good flexibility and stability.

While the above example shows only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, these adducts are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present carboalkoxylated amides are substantially unreactive with the commercially available heat and light stabilizers which are commonly employed with polyvinyl chloride or copolymers thereof, the presence of such materials in the plasticized products does not impair the valuable properties of the present esters. The present adducts are of general utility in softening vinyl chloride polymers. They may be used as the only plasticizing component in a compounded vinyl chloride polymer or they may be used in conjunction with other plasticizers.

What I claim is:

1. An adduct having the formula

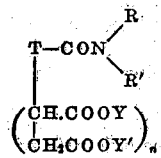

in which T is an aliphatic olefinic hydrocarbon residue free of conjugated unsaturation and having from 9 to 23 carbon atoms, R and R' are selected from the class consisting of hydrogen and alkyl radicals of from 1 to 8 carbon atoms, n is an integer of from 1 to 4 and Y and Y' are alkyl radicals of from 1 to 8 carbon atoms.

2. An adduct in which from 1 to 4 moles of a dialkyl fumarate having from 1 to 8 carbon atoms in the alkyl radical is combined at the acid portion of a N,N-dialkylamide of a tall oil unsaturated fatty acid fraction, each of said N-alkyl radicals having from 1 to 8 carbon atoms.

3. Amides having the formula

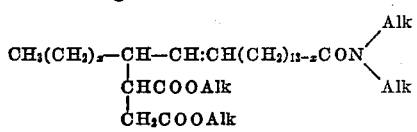

in which Alk denotes an alkyl radical of from 1 to 8 carbon atoms.

4. An adduct in which from 1 to 4 moles of an alkyl fumarate having from 1 to 8 carbon atoms in the alkyl radical is combined at the acid portion of a N,N-dialkylamide of a tall oil unsaturated fatty acid fraction, each of said N-alkyl radicals having from 1 to 8 carbon atoms.

5. An adduct in which from 1 to 4 moles of butyl fumarate is combined at the acid portion of the dimethylamide of a tall oil unsaturated fatty acid fraction.

6. The method which comprises contacting an amide having the formula

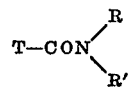

in which T is an aliphatic olefinic hydrocarbon residue free of conjugated unsaturation and having from 9 to 23 carbon atoms and R and R' are selected from the class consisting of hydrogen and alkyl radicals of from 1 to 8 carbon atoms with a fumarate having the formula

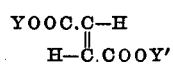

in which Y and Y' are alkyl radicals of from 1 to 8 carbon atoms, and recovering from the resulting reaction product an adduct having the formula

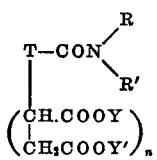

in which T is an aliphatic olefinic hydrocarbon residue free of conjugated unsaturation and having from 9 to 23 carbon atoms, R and R' are selected from the class consisting of hydrogen and alkyl radicals of from 1 to 8 carbon atoms, n is an integer of from 1 to 4 and Y and Y' are alkyl radicals of from 1 to 8 carbon atoms.

7. The method which comprises heating a dialkyl fumarate having from 1 to 8 carbon atoms in the alkyl radical with a N,N-dialkylamide of an olefinic acid selected from the class consisting of oleic acid and linoleic acid having from 1 to 8 carbon atoms in each N-alkyl radical and recovering from the resulting reaction product an adduct in which from 1 to 4 moles of said fumarate is combined at the acid portion of said amide.

8. The method which comprises contacting a dialkyl fumarate having from 1 to 8 carbon atoms in the alkyl radical with an N,N-dialkylamide of a tall oil unsaturated fatty acid fraction having from 1 to 8 carbon atoms in the N-alkyl radical and recovering from the resulting reaction product an adduct in which from 1 to 4 moles of said fumarate is combined at the acid portion of said amide.

9. The method which comprises heating dibutyl fumarate with the N,N-dimethylamide of a tall oil unsaturated fatty acid fraction and recovering from the resulting reaction product an adduct in which from 1 to 4 moles of said fumarate is combined at the acid portion of said amide.

References Cited in the file of this patent

UNITED STATES PATENTS

| | | |
|---|---|---|
| 2,188,882 | Clocker | Jan. 30, 1940 |
| 2,262,923 | Clocker | Nov. 18, 1941 |
| 2,325,951 | Gresham | Aug. 3, 1943 |
| 2,342,114 | Blair | Feb. 22, 1944 |
| 2,371,097 | Cahn et al. | Mar. 6, 1945 |
| 2,411,957 | De Groote et al. | Dec. 3, 1946 |
| 2,671,769 | Cowell | Mar. 9, 1954 |